W. J. KOCH.
SHIELD FOR BUTTON CUTTERS' SHELL TONGS.
APPLICATION FILED MAR. 9, 1920.
1,349,889.
Patented Aug. 17, 1920.
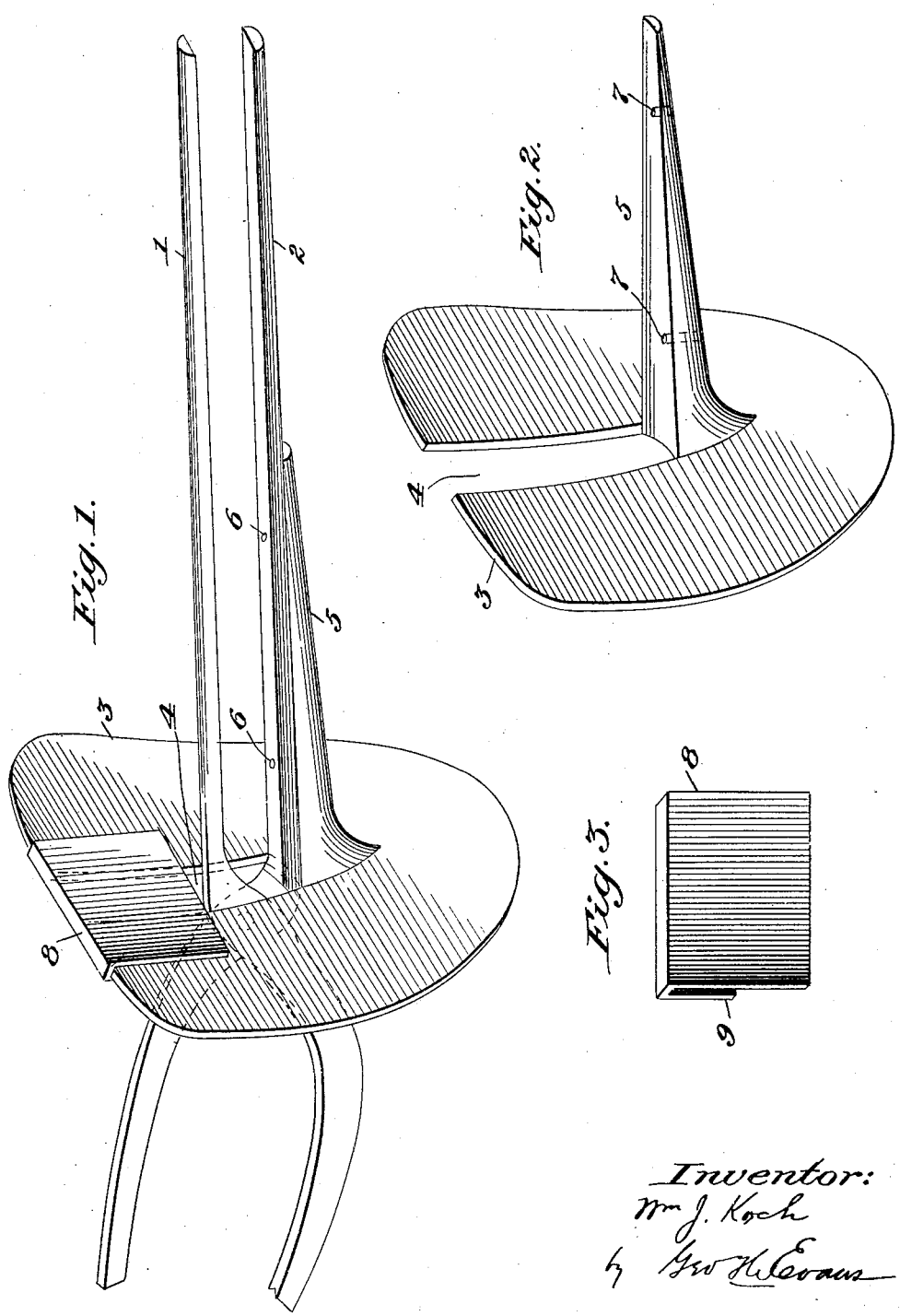

UNITED STATES PATENT OFFICE.

WILLIAM J. KOCH, OF LA CROSSE, WISCONSIN.

SHIELD FOR BUTTON-CUTTERS' SHELL-TONGS.

1,349,889.  Specification of Letters Patent.  Patented Aug. 17, 1920.

Application filed March 9, 1920. Serial No. 364,588.

*To all whom it may concern:*

Be it known that I, WILLIAM J. KOCH, a citizen of the United States, residing at La Crosse, in the county of La Crosse and State of Wisconsin, have invented certain new and useful Improvements in Shields for Button-Cutters' Shell-Tongs, of which the following is a specification.

My invention relates to shields for the tongs used in holding shell in the manufacture of pearl buttons. In cutting pearl button blanks the operator holds with his left hand the tongs which grasp the piece of shell and holds it up to the saw and as cold water is kept constantly playing on the saw the operator's left hand and wrist get very wet and cold. Furthermore, the shell sometimes slips or breaks in the tongs and this causes the operator's hand to push toward the saw and be injured thereby and the broken pieces of shell also cause injury.

The object of my invention is to provide a shield for button makers' tongs which will prevent wetting of and injury to the operator's hand and yet not interfere in the least with the proper use of the tongs.

This object I accomplish by the construction shown in the accompanying drawing in which:

Figure 1 is a perspective of my improved tong shield in position on a pair of tongs.

Fig. 2 is a perspective of the shield removed.

Fig. 3 is a perspective of the closure.

The tongs comprise the usual crossed pivoted members 1, 2, and 3 is the shield for use therewith. This shield 3 is formed of a shield-shaped piece of flat metal or other material and has an open slot 4 leading downwardly from its upper edge to about its center so as to receive the tongs just in rear of their pivotal point and allow free movement to the members 1 and 2. From the rear face of the shield 3 at the base of slot 4 projects a horizontal arm 5, which is secured to the lower member 2 at its underside by means of screws or rivets 6; the arm 5 being apertured at 7 for this purpose.

It is, of course, desirable to close the slot 4 to prevent the passage therethrough of water, pieces of shell and the like, and this is done by a closure 8 formed of a flat plate of suitable size having a downturned spaced lip 9 on the upper edge so as to fit over and firmly grasp the upper edge of the shield 3. With the closure in place there is just enough space left in the lower end of slot 4 for the relative movement of the tong members 1 and 2.

There is nothing whatever to interfere with the proper manipulation of the tongs by the operator or with the operator in his work.

What I claim is:

1. A shield for button cutters' shell tongs comprising, a plate having a slot extending downwardly from its upper edge toward its center and a rearwardly extending, horizontal arm for attachment to the under side of the lower handle member of a tongs in rear of the pivot.

2. A shield for button cutters' shell tongs comprising a plate having an open slot extending from one edge toward the center of the plate, a rearwardly extending apertured arm for attachment to a member of the tongs and a closure for the slot.

3. A shield for button cutters' shell tongs comprising a plate having an open slot extending downwardly from its upper edge toward the center of the plate, an attaching arm or flange at the base of the slot, and a closure for the slot formed of a plate having a spaced depending flange at its upper edge closely fitting the upper edge of the shield.

4. The combination with a button cutters' shell tongs, of a shield secured to one member of the tongs in rear of the pivotal point and having an opening to allow proper play of the handles.

5. The combination with a button cutters' shell tongs, of a shield having an open slot extending downwardly from its upper edge and receiving the handles of the tongs in rear of their pivotal point; the shield being united at the base of its slot to the lower jaw of the tongs, and a closure for the said slot.

In testimony whereof I affix my signature.

WILLIAM J. KOCH.